(12) United States Patent
Hsu et al.

(10) Patent No.: US 7,295,350 B2
(45) Date of Patent: Nov. 13, 2007

(54) PHOTOGRAPHIC FILM SCANNING DEVICE

(75) Inventors: Hsiu-O Hsu, Hsinchu (TW); Jen-Shou Tseng, Miaoli Hsien (TW); Jeng-Kwei Chen, Hsinchu (TW)

(73) Assignee: Transpacific IP Ltd, Taipei (TW)

( * ) Notice: Subject to any disclaimer, the term of this patent is extended or adjusted under 35 U.S.C. 154(b) by 647 days.

(21) Appl. No.: 09/948,611

(22) Filed: Sep. 10, 2001

(65) Prior Publication Data
US 2003/0048480 A1 Mar. 13, 2003

(51) Int. Cl.
*H04N 1/21* (2006.01)
*H04N 1/23* (2006.01)

(52) U.S. Cl. .................. 358/302; 358/474; 358/487
(58) Field of Classification Search ............... 358/474, 358/487, 506, 302, 494, 496, 497
See application file for complete search history.

(56) References Cited

U.S. PATENT DOCUMENTS

| | | | | |
|---|---|---|---|---|
| 5,726,773 A | * | 3/1998 | Mehlo et al. | 358/474 |
| RE36,246 E | * | 7/1999 | Nakano et al. | 396/390 |
| 6,062,746 A | * | 5/2000 | Stoebe et al. | 396/575 |
| 6,271,912 B1 | * | 8/2001 | Kurosawa et al. | 355/75 |
| 6,317,567 B1 | * | 11/2001 | Ichikawa et al. | 396/315 |
| 2003/0002092 A1 | * | 1/2003 | Tecu et al. | 358/506 |

FOREIGN PATENT DOCUMENTS

JP 10-290321 * 10/1998

* cited by examiner

*Primary Examiner*—Thomas D. Lee
(74) *Attorney, Agent, or Firm*—Stolowitz Ford Cowger LLP

(57) ABSTRACT

A photographic film scanning device includes an image scanner including a first casing having a transparent top surface and an optical scanning module movably arranged inside the first casing. A film driving assembly includes a second casing having a detachable bottom removably positioned on the top surface of the first casing. A light-transmitting window is defined in the bottom, having a length and a width. A film driving mechanism is arranged inside the second casing, including a film container for containing a length of film and a film spool for windingly receiving the film roll, respectively arranged on opposite longitudinal ends of the window. A motor drives a toothed wheel engaging perforations defined in the film for moving the film across the length of the window. A light source projects light through the film and the window toward the optical scanning module for performing scanning operation of the film.

36 Claims, 5 Drawing Sheets

PHOTOGRAPHIC FILM SCANNING DEVICE

BACKGROUND OF THE INVENTION

1. Field of the Invention

The present invention generally relates to a scanning device, and in particular to a photographic film scanning device capable of scanning a photographic film.

2. Description of the Prior Art

Document scanners are classified in two types, namely reflective type scanner and transmissive type scanner, for respectively handling a reflective original document and a transmissive original document. The reflective type scanner generally includes a case in which a light source, an optical scanning module, and guiding rails are mounted. A document positioning plate embedded on the top frame of the case of scanner is for support of reflective original document to be scanned. The optical scanning module comprises a focusing lens and an image sensing module such as a Charge Coupling Device (CCD) or a Contact Image Sensor (CIS). The movement of the optical scanning module is guided by guiding rails and driven by a mechanical transmission system. For reflective type scanner, a back-light module for providing back-light source, a carriage and a driving device are mounted for scanning of transparent original document.

Film scanner is available on market specially for scanning a photographic film. However, conventional film scanner can only scan transparency or a single frame, but not a series of consecutive frames of a length of film. It is an economic burden for consumers to purchase a film scanner for scanning of film in addition to an image scanner for scanning of ordinary documents. Moreover, it is very inconvenient to use two separate scanning devices at scanning operation.

Thus, a film scanner capable of scanning a series frames of photographic film is practical and helpful to users.

SUMMARY OF THE INVENTION

The primary object of the present invention is to provide a scanning device for scanning of a photographic film. The integrated design of film scanner and common image scanner greatly reduces costs and increases competitiveness.

Another object of the present invention is to provide a scanning device for scanning a series frames of photographic film. By means of a driving mechanism for continuously carrying consecutive frames of film to a scanning region and light projecting from the top of the scanning device in coordination with the guiding of optical module, a frame or a series frame of photographic film can be scanned.

To achieve the above objects, a scanning device of the present invention comprises a first casing having a transparent top surface and an optical scanning module movably arranged inside the first casing and a film driving assembly comprising a second casing having a bottom plate removably positioned on the top surface of the first casing. A light-transmitting window is defined in the bottom plate, having a predetermined length and a width. A film driving mechanism is arranged inside the second casing, comprising a film container for containing a length of film and a film spool for windingly receiving the length of film, respectively arranged on two opposite ends of the window. The film is retrieved from the film container, driven to the film spool and then wound on the film spool. The width of the window substantially corresponds to that of the film. A motor drives a toothed wheel engaging perforations defined in the film for moving the film across the length of the window. A light source projects light through the film and the window toward the optical scanning module for performing scanning operation of the film. A control unit controls the motor to timely move the film across the window in a predetermined manner whereby a series of consecutive frames of the film can be continuously read.

BRIEF DESCRIPTION OF THE DRAWINGS

The present invention will be apparent to those skilled in the art by reading the following description of a preferred embodiment and the best mode of operation thereof with reference to the attached drawings, in which.

DETAILED DESCRIPTION OF THE PREFERRED EMBODIMENTS

Figure 1:
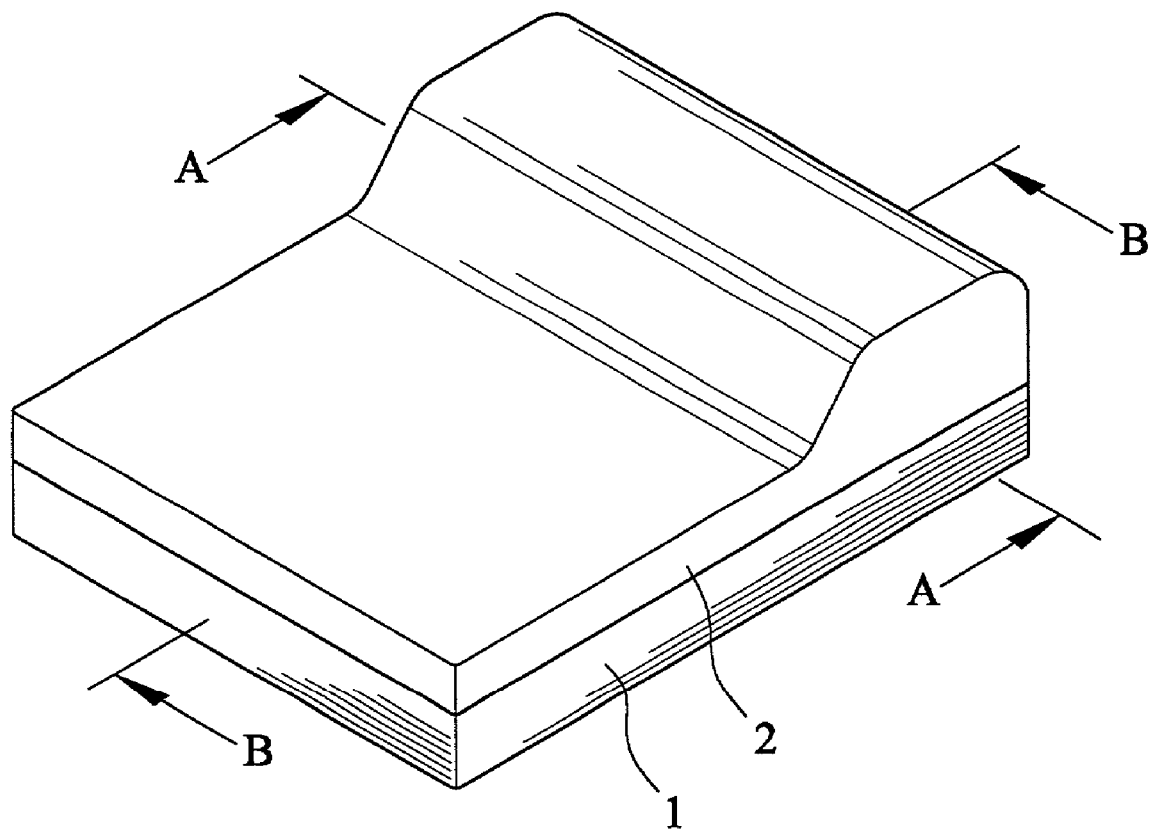
FIG. 1 is a perspective view of a photographic film scanning device of the present invention.
Figure 2:
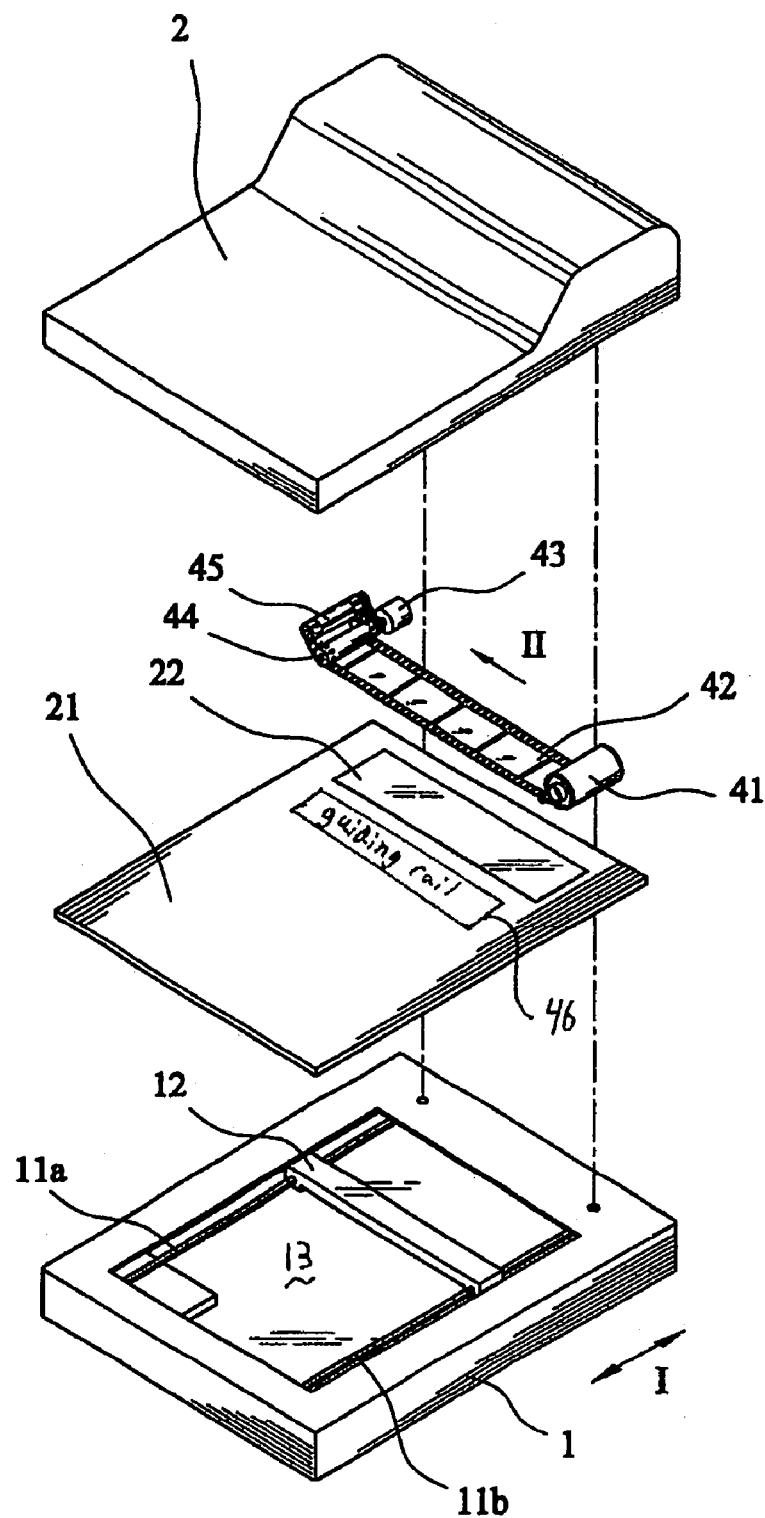
FIG. 2 is an exploded view of a photographic film scanning device of the present invention.

In FIG. 1, a photographic film scanning device constructed in accordance with the present invention is shown. FIG. 2 shows the exploded view of the photographic film scanning device. In the embodiment illustrated, the film driving assembly 2 is used in integration with an image scanning device 1 for scanning of consecutive frames of a photographic film. The photographic film scanning device 1 is fitted with a pair of guiding rails 11a, 11b, an optical module 12 and other mechanisms (e.g. driving mechanism, focusing lens, image sensing device, and so on).

The film driving assembly 2 of the present invention is positioned on the image scanning device 1 whereby the image scanning device 1 forms the lower portion of the scanning device, while the film driving assembly 2 forms the upper portion. The terms "upper" and "lower" as used herein intend to indicate the general, relative position between the film driving assembly 2 and the image scanning device 1 in a normal operation condition.

Figure 3:
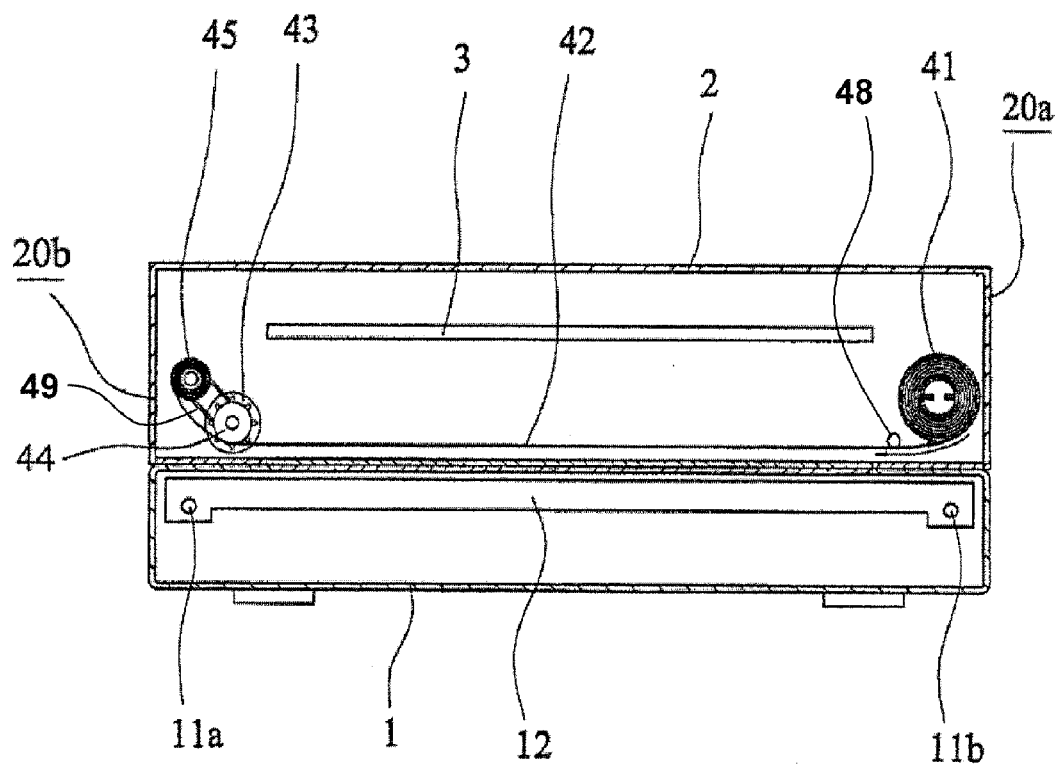
FIG. 3 is a cross-sectional view of the photographic film scanning device of the present invention along line A-A of FIG. 1.
Figure 4:
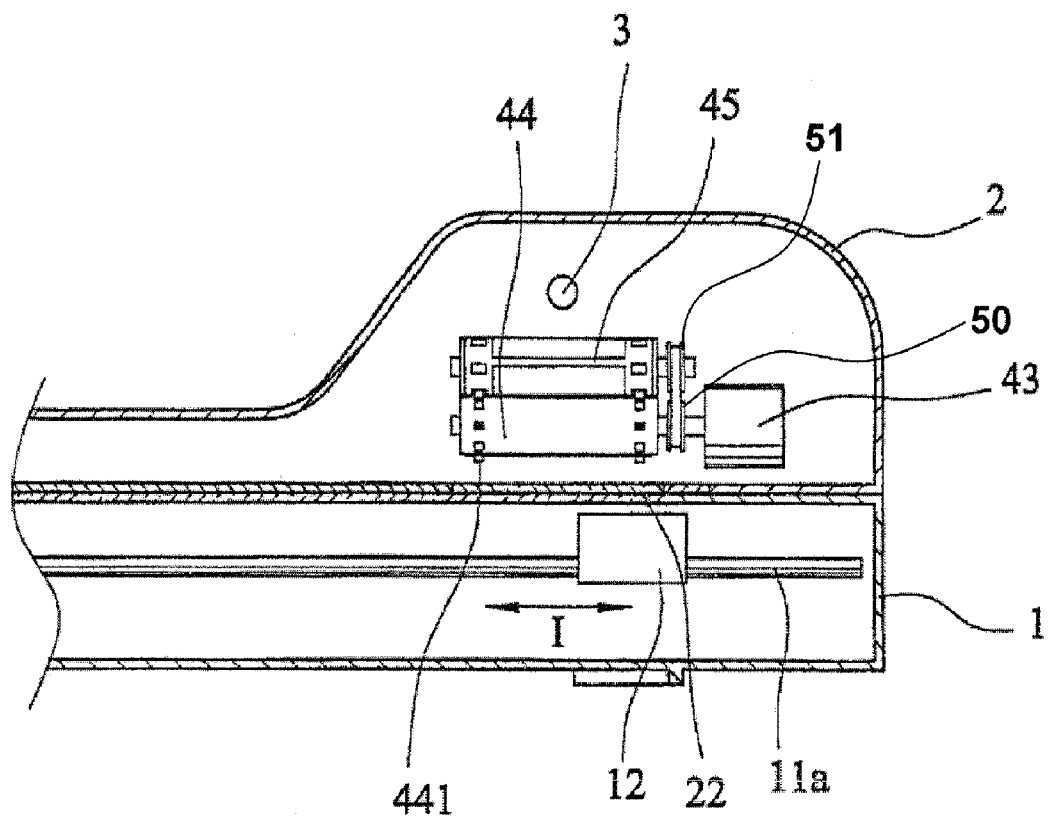
FIG. 4 is a cross-sectional view of the photographic film scanning device of the present invention along line B-B of FIG. 1.

Also referring to FIGS. 2-4, the image scanning device 1 comprises a pair of guiding rails 11a, 11b for guiding movement of an optical scanning module 12 carrying a sensor system in a first direction indicated by arrow I in FIGS. 2 and 4. The guiding rails 11a, 11b, the optical scanning module 12 and other components of the image scanning device 1 are housed in a first casing (not labeled) having a transparent top surface. The structure and operation of the image scanning device 1 are familiar to those having ordinary skills in the art and thus no further description is needed herein.

The film driving assembly 2 comprises a second casing (not labeled) having a detachable bottom plate 21. The bottom plate 21 substantially covers a transparent platen 13 of the image scanning device 1. A light-transmitting zone 22 having predetermined length and width is formed on the bottom plate 21. A light source, such as a tubular lamp 3, is mounted in the second casing of the film driving assembly 2 for emitting light through the light-transmitting zone 22 toward the optical scanning module 12 of the image scanning device 1.

The second casing of the film driving assembly 2 has opposite side walls 20a, 20b respectively located at adjacent opposite longitudinal ends of the light-transmitting zone 22. A film container 41 is fixed in the second casing proximate the first side wall 20a. A film 42, such as a film roll, comprising length of a light-transmissive medium with a series of successive frames formed thereon is removably received in the film container 41. The film 42 is retrieved from the film container 41 and driven by a film driving mechanism to move in a predetermined speed and direction, such as the second direction II of the embodiment illustrated across the light-transmitting zone 22. A guide post 48 may be provided to direct the film 42 as it is retrieved from the film container 41.

The film driving mechanism comprises a driving motor 43 to which a toothed wheel or sprocket 44 is coupled whereby the toothed wheel 44 can be rotated by the motor 43. The toothed wheel 44 has a number of teeth 441 engageable with perforations defined on opposite edges of the film 42 for driving the film 42 in the predetermined direction when the motor 43 is activated.

Figure 5:
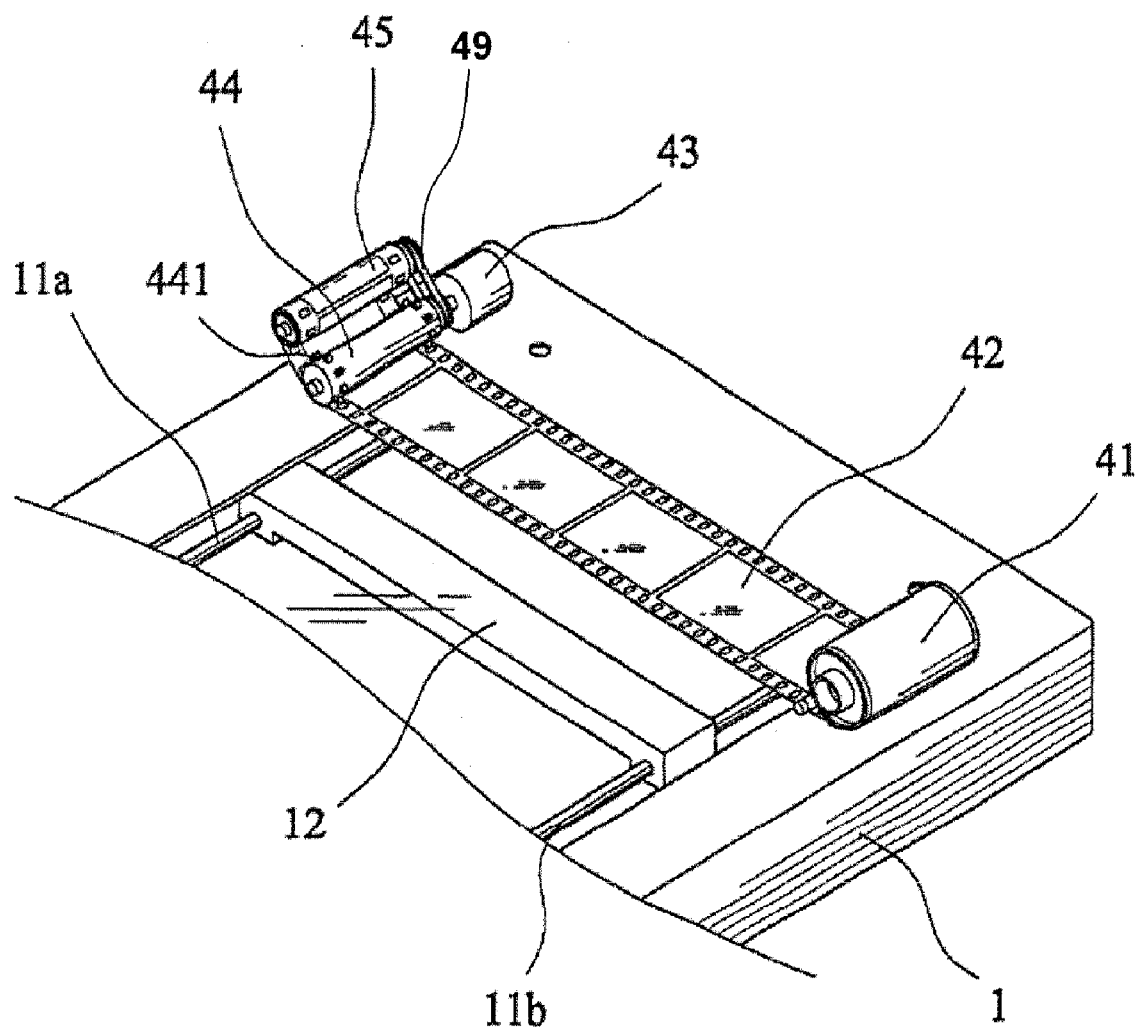
FIG. 5 is a perspective view showing the spatial positions of mechanisms at scanning of film.

Also referring to FIG. 5, a film spool 45 is rotatably supported in the second casing of the film driving assembly 2 proximate the second side wall 20b for receiving the film 42 that is driven by the motor 43 from the film container 41 in the predetermined direction across the light-transmitting zone 22 as shown in FIG. 5. Preferably, the film spool 45 is mechanically coupled to the motor 43 whereby the spool 45 is rotated to wind the film 42 thereon. The film spool 45 may be mechanically coupled to the motor 43 by a drive pulley 50, a drive belt 49, and a secondary pulley 51. When the film 42 is driven across the light-transmitting zone 22, light emitted from the light source 3 transmits through the frames of the film 42 that are located above the light-transmitting zone 22 for projecting the images of the frames of the film 42 onto the optical scanning module 12 whereby the images are read by the optical scanning module 12.

It is also apparent to those skilled in the art to devise a control unit that controls the optical scanning module to read a single frame of the film 42 during each scanning operation. Alternatively, the film 42 can be driven in such a way that each time the film 42 is moved a distance corresponding to a single frame. Furthermore, it is also possible that a film of a single frame can be placed on the light transmitting zone 22 to be read by the optical scanning module 12. In another embodiment, at least one guiding rail 46 (shown schematically in FIG. 2) may be arranged on the bottom plate 21 of film driving assembly 2 for smoothly guiding the movement of film 42.

It is also apparent to those skilled in the art to devise a control unit that controls the optical scanning module to read a single frame of the film 42 during each scanning operation. Alternatively, the film 42 can be driven in such a way that each time the film 42 is moved a distance corresponding to a single frame. Furthermore, it is also possible that a film of a single frame can be placed on the light transmitting zone 22 to be read by the optical scanning module 12. In another embodiment, at least one guiding rail may be arranged on the bottom plate 21 of film driving assembly 2 for smoothly guiding the movement of film 42.

Although the present invention has been described with reference to the preferred embodiment and the best mode of operation thereof, it is apparent to those skilled in the art that a variety of modifications and changes may be made without departing from the scope of the present invention which is intended to be defined by the appended claims.

What is claimed is:

1. A photographic film driving device mounted on an image scanning device capable of scanning an image of a photographic film, comprising:
   a casing removably mounted on the image scanning device, including a detachable bottom plate;
   a light-transmitting window including a length and a width, defined in the bottom plate;
   a film container capable of containing the photographic film comprising a series of successive frames, the film including a width substantially corresponding to the width of the light-transmitting window, wherein the film container is disposed adjacent to a first side of the light-transmitting window;
   a guide disposed adjacent to the film container;
   a film driving mechanism comprising a motor to which a toothed wheel and a drive pulley are coupled, wherein the motor is capable of rotating the toothed wheel and the drive pulley, wherein the toothed wheel is capable of engaging the film and capable of driving the film in a predetermined direction across the length of the light-transmitting window, and wherein the film driving mechanism is disposed adjacent to a second side of the light-transmitting window;
   a film receiving device capable of receiving the film driven by the film driving mechanism from the film container, the film receiving device mechanically coupled to the motor of the film driving mechanism by a drive belt and a secondary pulley, wherein rotation of the film receiving device via the motor of the driving mechanism is capable of winding the film on the film receiving device; and
   a light source capable of emitting a light that transmits through the frames of the film present on the light-transmitting window to project images of the frames onto the image sensing device.

2. A photographic film driving device as claimed in claim 1, wherein the film driving mechanism is adapted to drive the film in an intermittent manner and in a predetermined distance.

3. A photographic film driving device as claimed in claim 2, wherein the predetermined distance corresponds to the length of the light-transmitting window.

4. A photographic film scanning device comprising:
   an image scanner comprising an optical scanning module carrying image sensing elements located inside a first casing, the optical scanning module adapted to move in a first direction; and
   a film driving assembly comprising a light source and a film driving mechanism mounted inside a second casing, the second casing including a detachable bottom plate, wherein the bottom plate comprises at least one guiding rail capable of contacting the film to guide the movement of film, the film driving mechanism adapted to advance a portion of film containing a number of longitudinally arranged frames a predetermined distance in a second direction from a first position to a second position; wherein movement of the film caused by the film driving mechanism advances at least one of the frames to a scanning zone where a light source projects a light through the frame onto the optical scanning module and the optical scanning module moves in the first direction to scan the image of the frame.

5. A photographic film scanning device as claimed in claim 4, wherein the film driving assembly comprises a film container located at a first longitudinal end of the scanning zone capable of containing the film, the film being selectively coupled to the film driving mechanism and a film receiving device located at a second opposite longitudinal end of the scanning zone capable of receiving the portion of the film driven by the film driving mechanism from the film container.

6. A photographic film scanning device as claimed in claim 5, wherein the film driving mechanism comprises a toothed wheel operatively associated with a motor, teeth of the toothed wheel adapted to engage perforations defined in the film.

7. A photographic film scanning device as claimed in claim 5, wherein the second direction is substantially perpendicular to the first direction.

8. A photographic film scanning device as claimed in claim 5, wherein the predetermined distance substantially corresponds to a length of the scanning zone.

9. A photographic film scanning device as claimed in claim 5, wherein one or more frames of the film has a width, the predetermined distance substantially corresponding to the width of the frames.

10. A photographic film scanning device as claimed in claim 5, wherein the optical scanning module is adapted to move a distance corresponding to a dimension of the film in the first direction.

11. A photographic film scanning device as claimed in claim 5, wherein the scanning zone has a length corresponding to a plurality of frames of the film.

12. A photographic film scanning device as claimed in claim 5, wherein the scanning zone has a length corresponding to a frame of the film.

13. A photographic film scanning device as claimed in claim 5, wherein the film driving mechanism comprises:
a guide post adjacent to the film container;
a motor;
a drive pulley coupled to the motor;
a secondary pulley coupled to the film receiving device; and
a drive belt engaged with the drive pulley and the secondary pulley.

14. A film driving device, comprising:
a casing adapted to associate with an image scanning device, including a detachable bottom plate;
a light-transmitting window located in the bottom plate;
a film dispensing device adapted to retain film comprising a series of successive frames;
a film driving mechanism comprising a motor to which a toothed wheel is coupled, wherein the motor is capable of rotating the toothed wheel, wherein the toothed wheel is capable of engaging the film and capable of driving the film in a predetermined direction across the light-transmitting window;
a film receiving device mechanically coupled to the motor of the film driving mechanism, wherein rotation of the film receiving device via the driving mechanism is capable of winding the film on the film receiving device; and
a light source adapted to transmit light through at least a portion of the film adjacent the light-transmitting window onto an image sensing device.

15. The film driving device of claim 14, wherein the bottom plate comprises at least one guiding rail adapted to guide the movement of film across the light-transmitting window.

16. The film driving device of claim 14, wherein the light-transmitting window includes a width substantially corresponding to the width of the film.

17. The film driving device of claim 14, wherein the film dispensing device comprises a film container.

18. The film driving device of claim 14, wherein the film receiving device comprises a film spool.

19. The film driving device of claim 14, wherein the film driving mechanism is adapted to drive the film across the light-transmitting window from the film dispensing device to the film receiving device.

20. The film driving device of claim 14, wherein the bottom plate substantially covers a transparent platen of the image scanning device.

21. A film driving device, comprising:
a casing adapted to associate with an image scanning device, including a detachable bottom plate, wherein the bottom plate comprises at least one guiding rail capable of contacting the film to guide the movement of film;
a light-transmitting window located in the bottom plate;
a film dispensing device adapted to retain film comprising a series of successive frames;
a film receiving device adapted to receive the film from the film dispensing device;
a film driving mechanism adapted to drive the film across the light-transmitting window from the film dispensing device to the film receiving device; and
a light source adapted to transmit light through at least a portion of the film adjacent the light-transmitting window onto an image sensing device.

22. The film driving device of claim 21, wherein the bottom plate substantially covers a transparent platen of the image scanning device.

23. The film driving device of claim 22, wherein the light-transmitting window includes a width substantially corresponding to the width of the film.

24. The film driving device of claim 23, wherein the film dispensing device comprises a film container.

25. The film driving device of claim 24, wherein the film receiving device comprises a film spool.

26. The film driving device of claim 25, wherein the film driving device comprises a motor rotatably coupled to a toothed wheel and a drive pulley, the toothed wheel including teeth adapted to engage the film.

27. A system, comprising:
an image scanning device; and
a film driving device comprising:
a casing adapted to associate with the image scanning device, including a detachable bottom plate and a light-transmitting window located in the bottom plate;
a film dispensing device adapted to retain film comprising a series of successive frames;
a film receiving device mechanically coupled to a film driving mechanism by a drive pulley, a drive belt, and a secondary pulley, wherein rotation of the film receiving device via the film driving mechanism is capable of winding the film on the film receiving device; and
a light source adapted to transmit light through at least a portion of the film adjacent the light-transmitting window onto an image sensing device.

28. The film driving device of claim 27, wherein the bottom plate comprises at least one guiding rail adapted to guide the movement of the film across the light-transmitting window.

29. The film driving device of claim 27, wherein the light-transmitting window includes a width substantially corresponding to the width of the film.

30. The film driving device of claim 27, wherein the film dispensing device comprises a film container.

31. The film driving device of claim 27, wherein the film receiving device comprises a film spool.

32. The film driving device of claim 27, wherein the film driving mechanism is adapted to drive the film across the light-transmitting window from the film dispensing device to the film receiving device, and wherein the film driving device comprises a motor rotatably coupled to a toothed wheel, the toothed wheel including teeth adapted to engage the film.

33. A method, comprising:
retaining film at least via a film dispensing device;
receiving the film from the film dispensing device at least via a film receiving device;
driving the film across a light-transmitting window located in a detachable bottom plate from the film dispensing device to the film receiving device;
contacting the film to guide the movement of the film at least via one guiding rail located on the bottom plate; and
transmitting light through at least a portion of the film adjacent the light-transmitting window onto an image sensing device.

34. The method of claim 33, further comprising substantially covering a transparent platen of an image scanning device with the bottom plate.

35. An apparatus, comprising:
means for retaining film;
means for receiving the film from said means for retaining film;
means for driving the film across a light-transmitting window located in a detachable bottom plate from said means for retaining film to said means for receiving the film;
means for contacting the film to guide the movement of the film, wherein said means for contacting the film is located on the bottom plate; and
means for transmitting light through at least a portion of the film adjacent the light-transmitting window onto an image sensing device.

36. The apparatus of claim 35, further comprising means for substantially covering a transparent platen of an image scanning device.

* * * * *